United States Patent [19]

Masur et al.

[11] 4,075,564
[45] Feb. 21, 1978

[54] SELECTIVE CALLING ARRANGEMENT

[75] Inventors: Christian Masur, Grenchen; Václav Štverák, Solothurn, both of Switzerland

[73] Assignee: Autophon Aktiengesellschaft, Solothurn, Switzerland

[21] Appl. No.: 680,916

[22] Filed: Apr. 28, 1976

[30] Foreign Application Priority Data

Apr. 28, 1975   Switzerland .......................... 5435/75

[51] Int. Cl.² .............................................. H04B 1/00
[52] U.S. Cl. ........................................ 325/55; 325/64; 325/364; 340/147 R
[58] Field of Search .................. 325/55, 64, 323, 364; 340/147 R, 147 B, 168 R, 168 B, 311, 312

[56] References Cited

U.S. PATENT DOCUMENTS

| | | | |
|---|---|---|---|
| 3,114,142 | 12/1963 | Bode et al. | 325/55 |
| 3,171,098 | 2/1965 | Gabrielson | 325/55 |
| 3,335,406 | 8/1967 | Clark | 325/55 |
| 3,510,777 | 5/1970 | Gordon | 325/64 |
| 4,019,138 | 4/1977 | Watanabe | 325/4 |

*Primary Examiner*—Robert L. Griffin
*Assistant Examiner*—Jin F. Ng
*Attorney, Agent, or Firm*—Roland Plottel

[57] ABSTRACT

A selective calling arrangement for use in a radio communications system or the like. Each of the receivers in the system is assigned an unique binary code number which is transmitted to the receivers by r.f. pulses of fixed width separated by one of two fixed intervals respectively representing a binary "1" or a binary "0", the selective calling system being unaffected by the chopping of pulses on the transmission path.

3 Claims, 3 Drawing Figures

SELECTIVE CALLING ARRANGEMENT

BACKGROUND OF THE INVENTION a. Field of the Invention

Broadly speaking, this invention relates to radio communication. More particularly, in a preferred embodiment, this invention relates to a radio communication system wherein a fixed transmitter may selectively call any one of a plurality of portable receivers.

b. Discussion of the Prior Art

German Application No. 1,537,007 discloses a radio communications system comprising a plurality of portable receivers and at least one stationary transmitter wherein each receiver can be selectively called by means of binary encoded calling signals comprising pulses of equal length separated by intervals of differing lengths. In this known system, the receiver includes a first timing circuit having a first holding time for converting an incoming call signal into a binary signal, the length of said first holding time falling between the differing lengths of the pulse intervals; a memory for storing the binary signal characteristic of the particular receiver, each binary signal having a predetermined value; a counter for coordinating the received digits comprising the binary signal; a comparator circuit for comparing each digit of the received binary signal with the corresponding digit of the stored binary signal; and means for triggering a call indication when the received binary signal corresponds with the stored binary signal.

In the above described system, the particular suitability of the codes employed for transmitting calling signals over long, disturbed paths, on the one hand, and extremely short transmission paths, on the other hand, was not recognized.

The instant invention is based upon the discovery that it is possible to select the lengths of the encoded intervals as compared with the lengths of the transmitted pulses in such a way that even in situations where the pulses arrive lengthened or shortened, the two intervals can nevertheless be clearly distinguished. Only the complete loss of a pulse impairs the evaluation of a calling signal because in that event the call simply does not take place. It cannot, however, cause a false call because the requisite number of pulses to complete a call has not been reached. It is to be noted that non-completed calls cause much less subscriber inconvenience than false calls. In the prior art, however, false calls can be initiated by the chopping of individual pulses in the transmission path, thus causing multiple appearances of the same pulse at the receiver.

SUMMARY OF THE INVENTION

It is thus an object of this invention to provide a system of the kind described wherein false calls are precluded even in the event that individual pulses in the transmission path are chopped.

To this end, in a system according to the present invention, each receiver further comprises a second timing circuit having a second holding time which substantially corresponds to the duration of the pulses transmitted by the transmitter, this second timing circuit being rendered operative by the leading edges of the received pulses, the holding time of the second timing circuit being unaffected by further leading edges arriving while the second timing circuit is operative, the first timing circuit, counter, and comparator circuit processing only pulses which are produced by changes in the state of the second timing circuit.

In a preferred embodiment of the invention, apparatus is disclosed to provide a particularly simple evaluation of the incoming signals in that both the leading edges and the trailing edges of pulses are used for controlling circuitry.

A preferred embodiment of the invention will now be described in detail with reference to the accompanying drawings, in which:

DETAILED DESCRIPTION OF THE INVENTION

Figure 1:
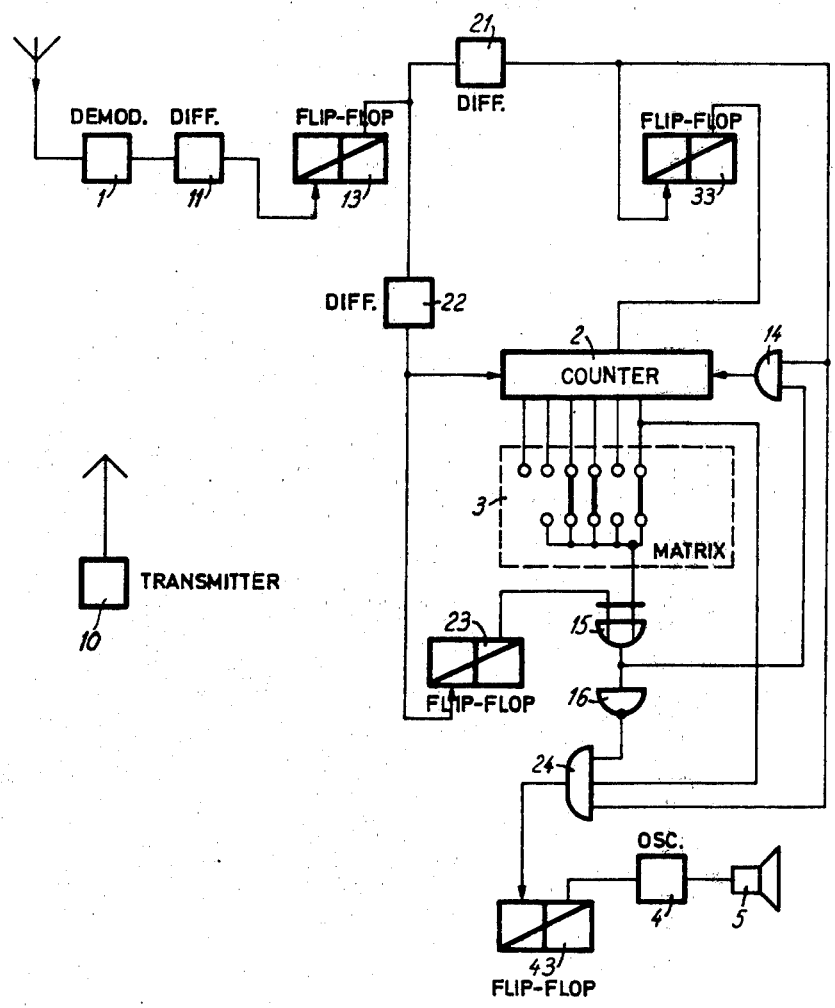
FIG. 1 is a block diagram of an illustrative receiver according to the invention.

The receiver illustrated in FIG. 1 includes a demodulation circuit 1, which demodulates the RF signal received by the antenna and which, if the RF signal of the appropriate frequency, generates a corresponding DC signal. Since the incoming signals are radio-frequency pulses, corresponding DC pulses will be generated by the demodulator 1. Reference numerals 11, 21, and 22 designate differentiators, each of which generates a short pulse based upon the edges of the signal conveyed to it. Differentiators 11 and 21 are responsive to the leading edges of the applied signals and differentiator 22 to the trailing edges. Reference numerals 13, 23, 33, and 43 designate monostable flip-flops which act as timing circuits. Flip-flop 13 has a holding time which corresponds to the duration of the pulses transmitted by transmitter 10. The holding time of flip-flop 23 is less than the longer of the two intervals which occur between the transmitted pulses but longer than the shorter interval. The holding time of flip-flop 33, on the other hand, is greater than the maximum spacing which can separate two received pulses belonging to the same calling signal. The holding time of flip-flop 43 determines the duration of the call indication and may be selected at will, within certain limits. The holding times of flip-flops 13 and 43 are not affected by pulses supplied thereto while they are in the operated state, whereas flip-flops 23 and 33 are retriggered and the holding time starts anew each time a pulse is supplied thereto even if they are already in the operated state.

Reference numeral 2 designates a counter which is always operated together with flip-flop 33 and which counts the pulses from differentiator 22. Counter 2 has six outputs and a voltage is applied to its first output when, after it has been activated, no counting pulse has yet been supplied to it from differentiator 22. Upon receiving pulses from differentiator 22, counter 2 applies voltages to the other outputs in succession. Counter 2 can be reset by a pulse delivered by an AND-gate 14. The calling signal to which a particular receiver is to respond is established by selectively connecting the outputs of counter 2 to the input of an EXCLUSIVE-OR gate 15, via a diode matrix 3. The first output of counter 2 is always unconnected; for the remaining outputs, the binary value 1 is established by a connection leading to the gate input, and the binary value 0 is established by a connection which is left open. As shown in FIG. 1, the calling signal 01101 must be transmitted in order to call the receiver in question.

In addition to the AND-gate 14, FIG. 1 includes a second AND-gate 24, and an inverter 16. While flip-flop 43 is operative, an audio oscillator 4 transmits a tone to a loudspeaker 5, which tone serves as a call indicator.

Figure 2:
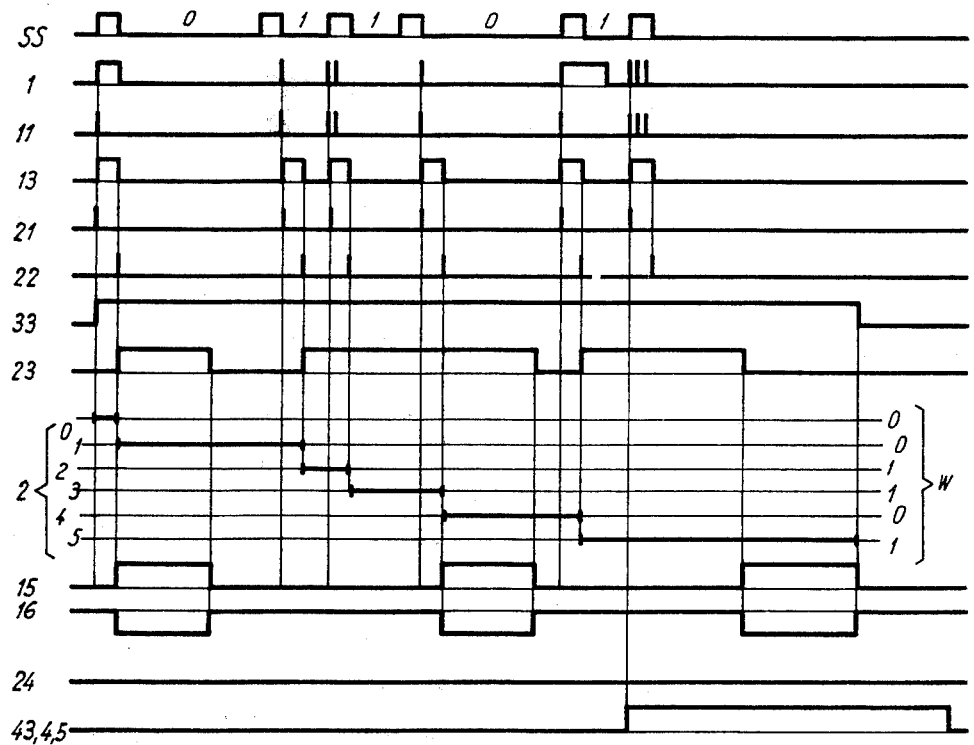
FIG. 2 is a graph showing, for the receiver shown in FIG. 1, the voltages occurring at various locations within the circuit and the rest and operating states of certain circuit elements, as a function of time.

The manner in which the various circuit components described cooperate and function will be made apparent from a study of FIGS. 2 and 3. In FIG. 2, the signal transmitted by transmitter 10 is designated as SS. It consists of a train of six pulses of equal length separated by long and short intervals. The short intervals correspond to the binary value 1 and the long intervals, which are illustratively three times as long as the short ones, to the binary value 0. The pulses themselves are shorter than the shorter of the two intervals.

In order to illustrate the mode of operation of the receiver in extreme cases, differing transmission conditions have been assumed in FIG. 2 for the transmission of the various pulses between the transmitter and receiver. The received and demodulated pulses are shown in line 1. The first pulse is assumed to have been received normally, so that it corresponds to the pulse as sent. The reception of the second and fourth pulses is shown as very weak and disturbed, so that at the end of their transmission, each of them is received as only a very short signal. In the case of the third pulse and the last pulse, there are disturbances shown which override the desired signal, causing a chopped signal to appear at the output of the demodulator 1. In the case of the penultimate pulse, the incoming signal is shown as very strong and, as a result of the decay of the filter, causes a lengthening of the received pulse, as compared with the one transmitted. In FIG. 3, normal conditions of reception are assumed. There, the first line, line 13, shows the state of flip-flop 13 that clearly corresponds to the calling signal sent out by transmitter 10.

The mode of operation of counter 2 is shown in the group of lines numbered 2. Each output of counter 2 is associated with one of the lines designated 0–5. Given at the right-hand end of each line is the binary value W for which the respective output is connected. The value for line 0 is always 0, and the values for lines 1–5 correspond to the calling signal assigned to the receiver in question.

The signals supplied by demodulator 1 to differentiator 11 cause the generation of the pulses indicated in line 11, which pulses, in turn, cause flip-flop 13 to generate pulses. The latter pulses, shown in line 13, are of the same length as the transmitted pulses but are in part delayed by up to one pulse-duration. Between these newly-generated pulses, there are, as in the case of the original pulses, long and short intervals. These intervals are, however, shortened or lengthened by up to one pulse-duration as compared with their original value but, nevertheless, can still be classed as one or the other of the two kinds if a suitable selection of pulse and interval lengths is made. The pulses shown in line 13 are conveyed for further processing to differentiators 21 and 22, which respectively generate the pulses shown in lines 21 and 22.

By virtue of the pulses emanating from differentiator 21, which is responsive to the leading edge of the pulses from flip-flop 13, flip-flop 33, and thus counter 2, is rendered operative and kept in this state until the entire calling signal is finished.

By virtue of the pulses transmitted by differentiator 22, which is responsive to the trailing edge of the pulses from flip-flop 13, counter 2 is advanced, and flip-flop 23 enabled. The holding time of flip-flop 23 is advantageously double the nominal value of the short interval and is, thus, two-thirds of the long interval. Thus, if a succession of two pulses with a short interval between them is received, flip-flop 23 will remain in its operated state, but upon the occurrence of a long interval pulse it will return to its rest state. Since the trailing edge processed by differentiator 22 has a constant spacing from the leading edge of a received pulse, the time between the leading edges of two received pulses is measured indirectly by flip-flop 23 which, thus, serves as a timing circuit.

This measurement takes place by ascertaining, with the aid of EXCLUSIVE-OR-gate 15 and AND-gate 14, the state of flip-flop 23 at the moment when the leading edge of a pulse arrives. If the state of flip-flop 23 does not agree with the signal at the output of the matrix 3, a signal, shown in line 15, occurs at the output of the gate 15. If, on the other hand, there is agreement, inverter 16 transmits a signal which is shown in line 16. The output of gate 15 is enabled only during the time that pulses are supplied by differentiator 21, via the AND-gate 14, whereas the signal transmitted by inverter 16, as a result of AND-gate 24, triggers flip-flop 43 only when counter 2 is at its last position and a pulse is transmitted by differentiator 21.

The calling signal sent out from transmitter 10 and shown in FIG. 2 exhibits the binary values 01101 and corresponds to the circuit of matrix 3 shown in FIG. 1. Under these conditions, during the occurrence of the leading edges of the signal generated by flip-flop 13, i.e., during the occurrence of an output signal from differentiator 21, no voltage is present at the output of the gate 15, so neither is any signal present at the output of the gate 14. Thus, counter 2 is advanced to its last position. At the beginning of the last pulse generated by flip-flop 23, the conditions for the generation of an output signal by gate 24 are satisfied. Hence, flip-flop 43 is now rendered operative, which causes a call indication to be transmitted to loudspeaker 5.

Figure 3:
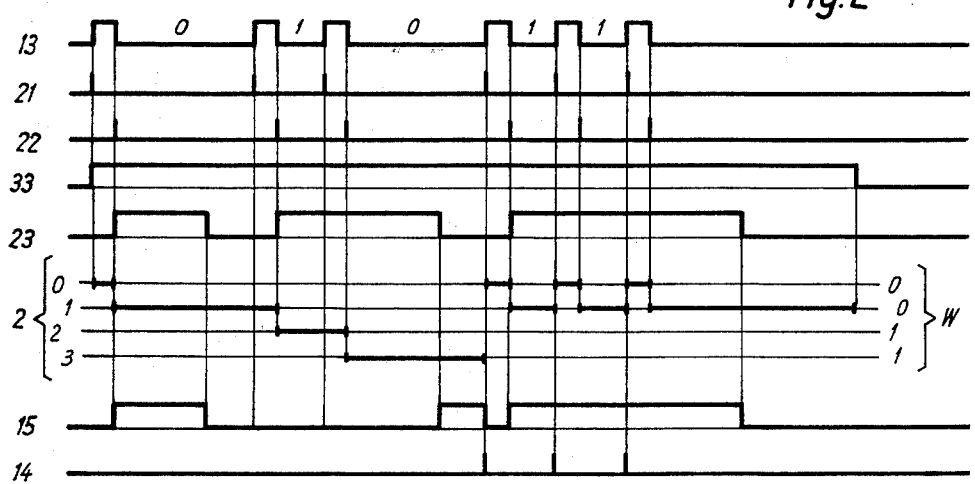
FIG. 3 is a graph showing the same relationships shown in FIG. 2, but for the situation where a signal is received which is not intended to call this receiver.

In FIG. 3, the reception of a calling signal having the binary values 01011 is shown which does not, of course, correspond to the circuit of matrix 3 in FIG. 1. That is, a receiver other than the one illustrated in FIG. 1 is intended to be called by transmitter 10. As a result of the changed conditions, as compared with FIG. 2, the leading edge of the fourth pulse now appears at a moment in time when the output of gate 15 carries a signal. Consequently, at the output of the gate 14 a pulse occurs which results in the immediate resetting of counter 2. With the trailing edge of the fourth pulse, counter 2 is reset and again advanced from the starting position to the first counting position.

After a resetting, the course of events which results when further pulses are received depends upon the connections in matrix 3 and upon the signal received and is, thus, more or less fortuitous. The counter may be reset once or several times more; this, however, has no influence upon the final result which is, in all cases, that counter 2 never reaches its last position by the time that the penultimate pulse of the calling signal is received. In the example shown, it turns out that the leading edge of each pulse received after the first resetting, resets the counter again and the counter thus just cycles back and forth between the starting position and the first position. Because the counter never reaches its last position, flip-flop 43 cannot operate via gate 24, so that the call indictor cannot sound.

Once the last pulse has arrived, flip-flop 33, after an interval of time which is longer than the longest interval between pulses, returns to its rest state, whereupon the circuit returns to normal.

Because flip-flops 33 and 43 are independent from one another, the holding time of flip-flop 43 may be made significantly longer than that of flip-flop 33. This means that following a call to a first receiver, since the non-called receivers are back in their rest positions once the calling signal has terminated, it is already possible to call another receiver even though the call indicator at the called receiver is still sounding.

Instead of the above-described monostable flip-flops having relatively large time constants, counters which count off a certain number of relatively short pulses may also be used as timing circuits.

It would also be possible to dispense with flip-flop 43 if a holding time corresponding to the length of the call indication were selected for flip-flop 33 and if the audio oscillator were connected in such a way that after it responds, it would remain operative for the same length of time as the counter.

Although the present invention has been described in connection with a particular embodiment thereof, it is to be understood that additional embodiments, modifications, and applications thereof which will be obvious to those skilled in the art are included within the spirit and scope of the invention.

We claim:

1. In a selective calling system of the type wherein a fixed transmitter transmits a binary-encoded calling signal to a plurality of portable receivers, said calling signal comprising radio-frequency pulses of uniform width separated by first and second intervals respectively representative of the two binary states in said calling signal, and wherein each said receiver comprises means for receiving the encoded pulses transmitted by said transmitter, comprising an RF demodulator for generating DC pulses corresponding to said radio-frequency pulses, a first timing circuit triggered in dependence of said DC pulses, the holding time of said first timing circuit being intermediate said first and said second pulse intervals and being restored with every triggering pulse, means to detect the binary value of each interval by detecting the state of said first timing circuit at the end of said interval, a memory for storing the binary signal uniquely assigned to call said receiver, means for comparing said detected binary signal with said stored binary signal and for generating an alarm signal if there is a correspondence between said two binary signals and means for generating a reset signal for restoring said comparing means if there is no generation of DC pulses during a certain time interval, the improved receiver which comprises:
    a first differentiating circuit connected to the output of said demodulator for generating a train of short pulses corresponding to the leading edges of said DC pulses;
    a second timing circuit having a triggering input connected to the output of said first differentiating circuit, said second timing circuit, when triggered, generating a pulse which has a duration substantially equal to the duration of each of said pulses of uniform width, said pulse duration is unaffected by repeated triggering of said second timing during the generation of said pulse, said pulse exclusively determining the triggering and the moment of detecting the state of said first timing circuit.

2. The receiver according to claim 1, wherein each receiver comprises a counter with a plurality of outputs coordinating the comparison of the detected binary values of the received signal with the binary values of the signal stored in said memory, means disabling the counter to reach its last position if the result of the comparison is negative and means triggering the alarm signal when the counter is in its last position, the receiver further comprises:
    second and third differentiating circuits connected to the output of said second timing circuit for respectively generating trains of short pulses corresponding to the leading and to the trailing edges of the output pulses from said second timing circuit, the pulses corresponding to the leading edges enabling said detection of the state of the first timing circuit and
    said triggering of the alarm signal and the pulses corresponding to the trailing edges triggering said first timing circuit and said counter.

3. The receiver according to claim 2, said means for disabling the counter to reach its last position generating a reset signal if the result of said comparison is negative and applying said reset signal to the counter.

* * * * *